United States Patent [19]

Woodman

[11] Patent Number: 4,779,690
[45] Date of Patent: Oct. 25, 1988

[54] SYSTEM FOR WEIGHING CONTAINERS

[75] Inventor: Stuart D. Woodman, Markham, Canada

[73] Assignee: Racal-Chubb Canada Limited, Mississauga, Canada

[21] Appl. No.: 96,537

[22] Filed: Sep. 15, 1987

[51] Int. Cl.⁴ .............. G01G 5/04; G01G 19/52; G01G 19/14
[52] U.S. Cl. .................. 177/208; 177/132; 177/147
[58] Field of Search ............... 177/145–147, 177/208, 16, 132

[56] References Cited

U.S. PATENT DOCUMENTS

| | | | |
|---|---|---|---|
| Re. 27,234 | 11/1971 | Smieja | 177/146 |
| 3,542,091 | 10/1970 | Carter | 177/208 X |
| 3,876,018 | 4/1975 | Mracek et al. | 177/132 |
| 3,910,365 | 10/1975 | Buchele | 177/208 X |
| 4,098,116 | 7/1978 | Browne | 177/16 X |
| 4,657,095 | 4/1987 | Hardin, Jr. et al. | 177/132 |

Primary Examiner—George H. Miller, Jr.
Attorney, Agent, or Firm—Ridout & Maybee

[57] ABSTRACT

Containers such as liquefied gas cylinders are weighed in situ using a balance comprising a pneumatic actuator connected between a support temporarily installed above a container to be weighed and the container itself. Gas pressure is applied to the actuator to lift the container off the surface on which it is standing, and the pressure required to hold it off that surface is measured to indicate the weight of the container. A limiting valve is associated with the actuator so as to limit pressure therein to that required to lift the container.

5 Claims, 2 Drawing Sheets

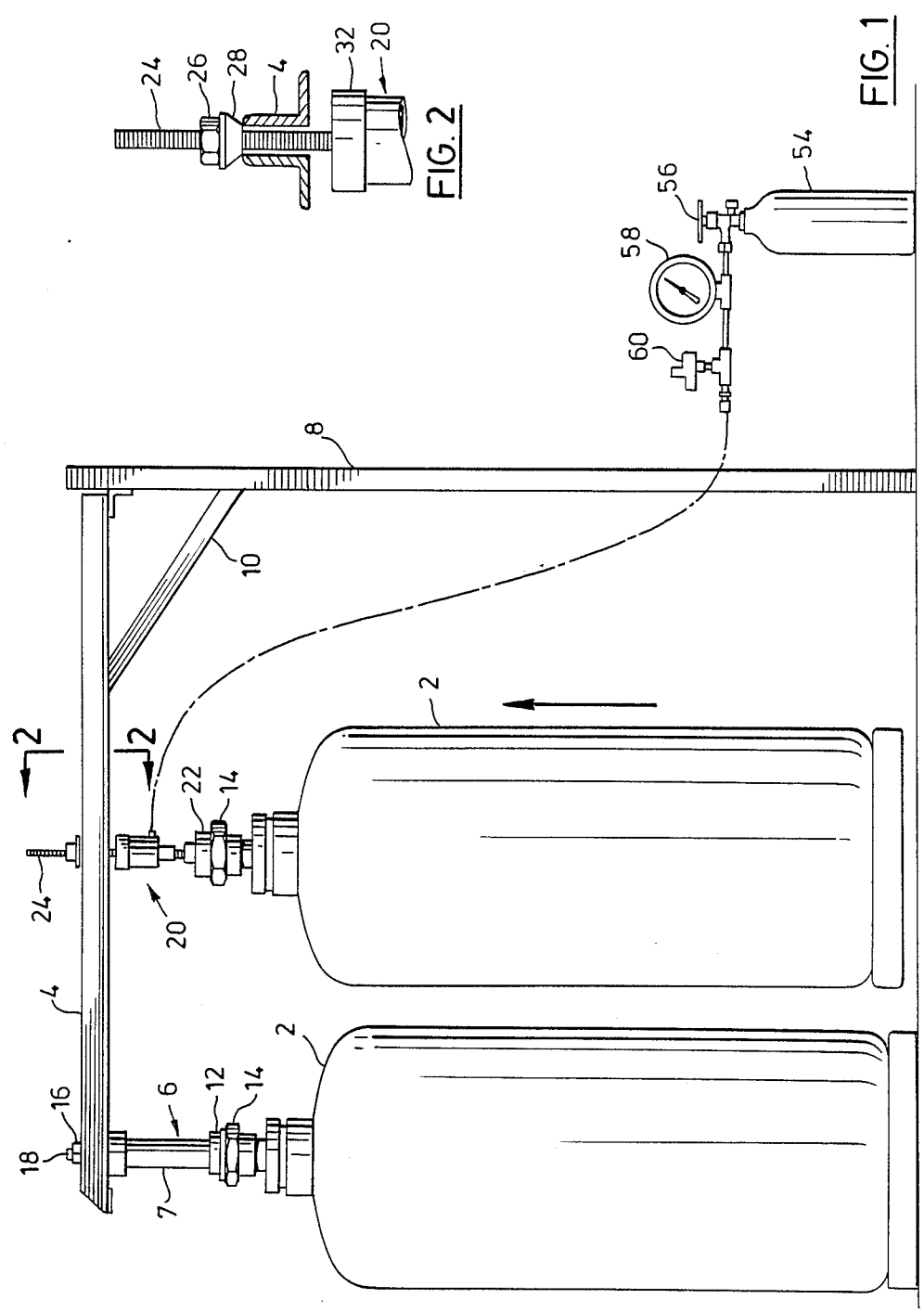

SYSTEM FOR WEIGHING CONTAINERS

This invention relates to the weighing of containers, particularly but not exclusively cylinders containing compressed or liquefied gases.

It is often important to verify, for example in automatic fire extinguishing systems, whether such cylinders are adequately charged. Particularly in the case of gases liquefied under pressure, this can only be adequately ascertained by weighing each cylinder. Especially in large sizes, such cylinders are very heavy, awkward and hazardous to handle, and it may be inconvenient and difficult to use conventional weighing apparatus.

Proposals have been made for devices in which fluid pressure is used to support a load, and this pressure is measured to indicate the weight of the load. Examples of such systems are disclosed in U.S. Pat. Nos. 3,115,944 (Weber) and 3,220,500 (Wilmeth) but in each case the load to be measured must be placed on a platform or support forming part of the weighing apparatus, and thus such devices are unsuitable for weighing containers in situ. A conventional spring suspension balance can only be used in conjunction with some sort of hoist to transfer the weight of the container to the balance, and the combination will require substantial headroom for operation, whilst a steelyard type balance will be bulky and can only be used where there is room to install its beam and fulcrum support.

There is therefore a need for apparatus for in situ weighing of containers which can be used in confined spaces, can be made readily portable even when very massive containers are to be weighed, and can be made capable of a reasonably high degree of accuracy.

Accordingly the invention provides apparatus for determining the weight of containers supported on a surface, comprising a fluid operated actuator having opposite end portions drawn together by the application of fluid pressure to the actuator, a supporting structure for placement above a container to be weighed, means connecting one end portion of the actuator to the supporting structure, means for releasably connecting the other end portion of the actuator to said container, a source of pressurized fluid connected to the actuator, and means to indicate the pressure of fluid applied to the actuator by the source when the actuator acts on the supporting structure and the container to lift the latter clear of the surface.

The supporting structure may be a supporting beam, including means to support the beam at at least one end from a further container similar to that being weighed. The source of pressurized fluid may be a cylinder of compressed gas, and the pressure indicating means a pressure gauge combined with a limiting valve integral with the actuator, which releases gas from the latter in response to a predetermined travel of the actuator sufficient to lift the container, in a manner such as to provide an audible signal. The gas should be selected such that its release under conditions of use of the apparatus does not constitute a hazard.

Further features of the invention will be apparent from the following description of a preferred embodiment with reference to the accompanying drawings, in which:

FIG. 1 is an elevation illustrating the apparatus in use;

FIG. 2 is a sectional detail on the line 2—2 in FIG. 1; and

Figure 3:
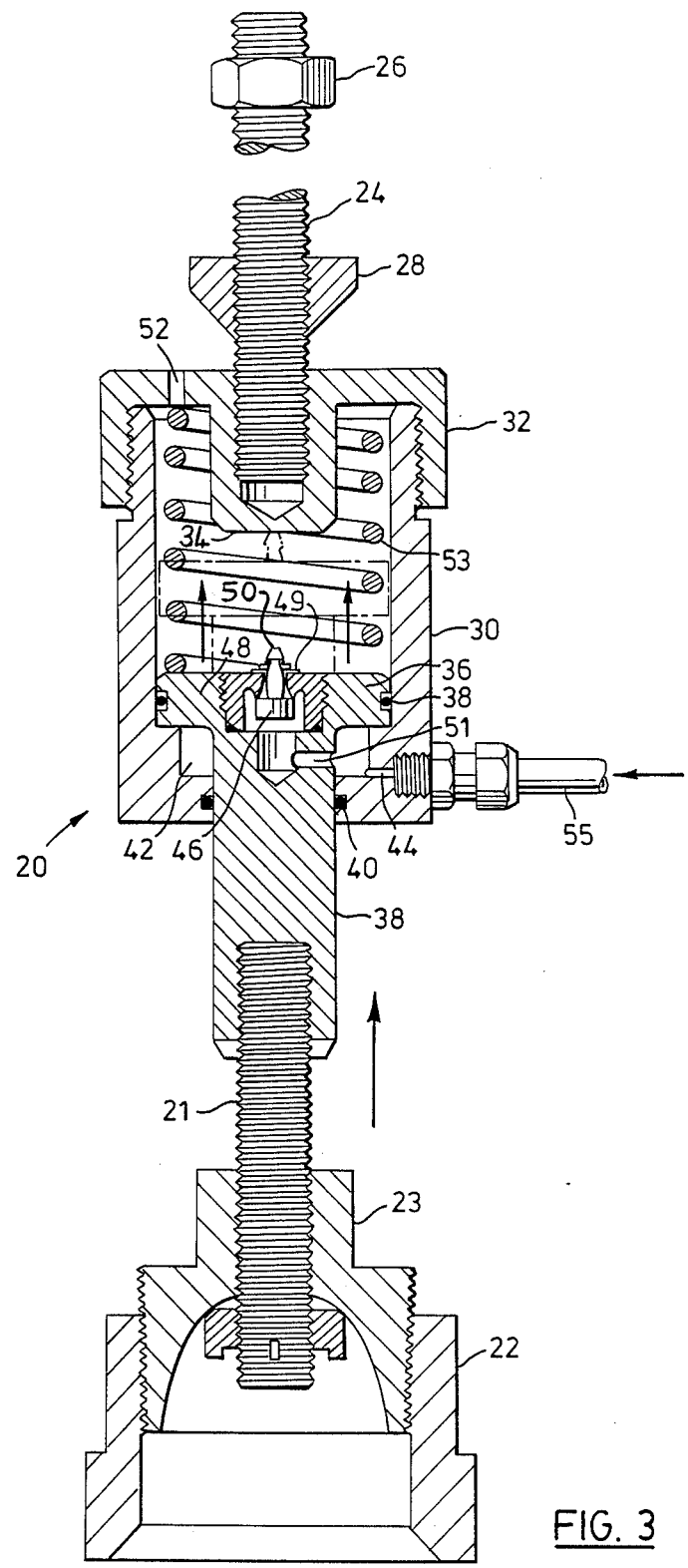
FIG. 3 is a vertical section through an actuator unit shown in FIG. 1.

Referring to FIG. 1, apparatus is shown for weighing cylinders charged with, for example, bromochlorodifluoromethane for use in fire extinguishing systems. Two cylinders 2 are shown, and an overhead supporting beam 4 of inverted channel section (see FIG. 2) is shown temporarily installed above one of them, one end of the beam being supported by a support 6 attached to the second cylinder, and the other by an end support 8, secured by the beam by bolts and a brace 10. The adaptor 6 has a tubular body 7 with an externally threaded coupling 12 at its lower end which is secured to the top of the cylinder by a nut 14. At the upper end of the support, a threaded stud 18 extends through one of a series of elongated slots in the upper wall of the beam 4, so that the tubular body may be clamped to the beam by a nut 16. It should be understood that the end support 8 is not required if a further support 6 and cylinder 2 is available to support the other end of the beam. This makes the apparatus particularly suitable for use where a group of closely spaced cylinders is to be weighed.

An actuator unit 20 is secured between the beam 4 and a cylinder 2 to be weighed. A lower end of the actuator has a stem 21 connected by an adaptor 23 to a coupling 22 similar to the coupling 12, and releasably secured to the cylinder by a further nut 14. A further threaded stem 24 at the upper end of the actuator extends through a slot in the upper wall of the beam 4, and a nut 26 takes up clearance between the beam and a thrust bearing 28, with the actuator 20 in its fully extended position.

As best seen in FIG. 2, the actuator comprises a cylinder 30 connected to the stem 24 by a screw cap 32 having a threaded socket 34 receiving the lower end of the stem. An actuator piston 36 has a piston rod 38 projecting through an opening in the closed bottom end of the cylinder 30, the stem 21 being screwed into a threaded socket in the piston rod. The piston 36 and the opening in the cylinder 30 are provided with 0-rings 38 and 40 to provide a sealed chamber 42 beneath the piston to which gas can be admitted through an inlet port 44. A limiting valve member 46 is captive within a chamber formed by a valve seat 48 screwed into a recess in the upper surface of the piston 36, the member 46 being biased to closed position against the seat 48 by a spring 49. The valve member has a stem 50 projecting through the seat 48 so as to contact the socket 34 after a predetermined travel of the piston and thus unseats the valve member, releasing gas from the chamber beneath the piston through a passage 51. Thus gas escapes from the cylinder through an orifice 52 in the cap 32. The limiting valve limits the distance through which the actuator can move the stems 21 and 24 towards each other, and also limits the pressure beneath the piston to that required to move the actuator through that distance. Operation of the limiting valve is signalled by noise of gas escaping through the orifice 52. A spring 53 biases the actuator 20 towards its extended position.

The port 44 is connected by a flexible copper tube 55 to a further gas cylinder 54 equipped with a shut-off valve 56, a pressure gauge 58, and a normally closed, manually oprrated exhaust valve 60. When the valve 56 is opened, the gas pressure beneath the piston 36 will rise until the force developed by the actuator 20 is sufficient to lift the cylinder 2 from the surface upon which it stands, as shown in FIG. 1. At this point, the limiting valve 46 will open to limit the pressure beneath the piston, and the noise of escaping gas will signal that lifting has occurred. The valve 56 is now closed, whereupon the pressure registered upon gauge 58 will be the pressure generated by the weight of the cylinder acting on the gas trapped in the system. Since there is no gas flow through the system in this condition, no pressure drop occurs between the gauge and the limiting valve, and the accuracy of the reading will be limited only by the accuracy of the pressure gauge.

The gas contained in cylinder 54 should of course be such as to be non-hazardous in the environment in which it is used. Carbon dioxide will normally be satisfactory, and is readily available in small, readily portable cylinders. The nuts 14 are readily released from the adaptors 12 and 22, and thus the apparatus may be easily applied to different cylinders to be weighed in situ.

I claim:

1. Apparatus for determining the weight of containers supported on a surface, comprising a fluid operated actuator having opposite end portions drawn together by the application of fluid pressure to the actuator, a beam for placement above a container to be weighed, means connecting one end portion of the actuator to the beam, means for releasably connecting the other end portion of the actuator to said container, a source of pressurized fluid connected to the actuator, and means to indicate the pressure of fluid within the actuator when the actuator is acting on the beam and the container to hold the latter clear of the surface, whereby to indicate the weight of the container, and means to support the beam at at least one end on a further container similar to that to be weighed.

2. Apparatus according to claim 1, wherein the beam has an inverted channel section, and slots in its upper surfaces to pass threaded studs which in conjunction with nuts threaded thereon form connections to said actuator and to said support means respectively.

3. Apparatus according to claim 1, wherein the actuator comprises a limiting valve responsive to a predetermined travel of the actuator sufficient to lift said container to release pressurized fluid from said actuator whereby to limit pressure in said actuator to that necessary to lift the container.

4. Apparatus according to claim 1, wherein said source of pressurized fluid is a cylinder of compressed gas.

5. Apparatus according to claim 4, wherein the gas is carbon dioxide.

* * * * *